United States Patent [19]

Weimer

[11] 3,728,811

[45] Apr. 24, 1973

[54] PLUG TYPE FISHING LURES

[76] Inventor: Emory L. Weimer, Orondo, Wash. 98843

[22] Filed: Feb. 16, 1971

[21] Appl. No.: 115,585

[52] U.S. Cl................................43/26.2, 43/42.12
[51] Int. Cl..............................................A01k 85/00
[58] Field of Search..........................43/42.12, 42.17, 43/42.31, 42.19, 42.2, 26.2, 42.06

[56] References Cited

UNITED STATES PATENTS

| 3,071,884 | 1/1963 | Peltz | 43/42.12 |
| 865,676 | 9/1907 | Brown | 43/42.17 |
| 2,952,935 | 9/1960 | Jordan | 43/42.06 |

Primary Examiner—Hugh R. Chamblee
Attorney—Fred C. Matheny

[57] ABSTRACT

A plug body has in it a cavity in which a water driven rotor is rotatively mounted. A water conduit in the plug body has an intake opening positioned forwardly of the rotor and a discharge opening positioned to direct water onto the rotor to rotate the same. The weight of the rotor is off-center relative to its axis of rotation and when said rotor is rotated the off center weight will cause said rotor to vibrate and impart to the plug body an erratic movement alluring to fish. Means controlled by the rotor to jet water sidewise from the plug body and further increase its erratic movement is also provided.

7 Claims, 12 Drawing Figures

Patented April 24, 1973

INVENTOR.
Emory L. Weimer
BY
Fred C. Matheny
Attorney

Patented April 24, 1973

INVENTOR.
Emory L. Weimer
BY
Fred C. Matherne
Attorney

PLUG TYPE FISHING LURES

SUMMARY OF THE INVENTION

When a plug type fishing lure is in use in the water there is usually a substantial amount of relative movement between the lure and the water in which it is immersed. This may be due to flow of the water or to trolling movement of the lure or to both.

A primary object of my invention is to provide a plug type fishing lure which has within it means operated by relative movement between the lure and the water in which it is immersed for imparting to the lure an erratic or wabbling movement which makes it more alluring to fish.

Another object is to provide a plug type lure having within it a water driven rotor or water wheel rotatively mounted on an axis and in which the weight of the rotor is off-center relative to its axis of rotation so the rotor will be caused to vibrate or pound when it is rotated, and in so doing, will impart an erratic movement to the plug body.

Another object is to provide a plug type lure having in it a cavity through which water can flow and having within the cavity a rotor arranged to be driven by water flowing through the cavity and further having water discharge means controlled by rotation of the rotor for discharging interrupted jets of water sidewise from different sides of the plug body to impart erratic movement to said plug body.

Other objects of my invention will be apparent from the following description and accompanying drawings.

BRIEF DESCRIPTION OF THE DRAWINGS

Like reference numerals refer to like parts throughout the several views.

DESCRIPTION OF THE PREFERRED EMBODIMENTS

Figure 1:
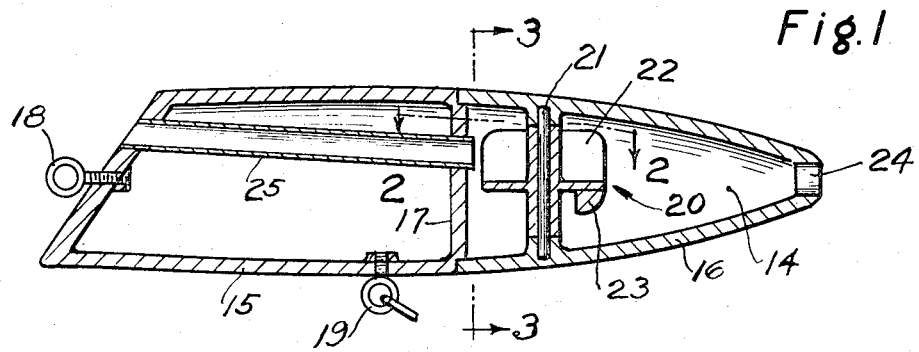
FIG. 1 is a view in longitudinal section, with parts in elevation, of a plug type fishing lure embodying my invention.
Figure 2:
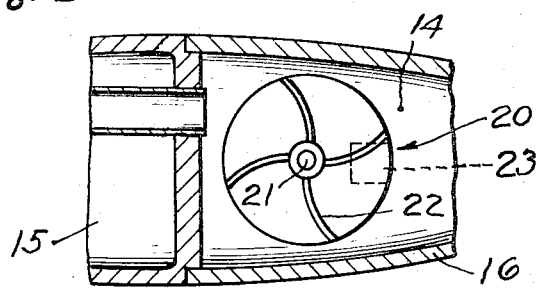
FIG. 2 is a fragmentary view, partly in section and partly in plan, taken substantially on line 2—2 of FIG. 1.
Figure 3:
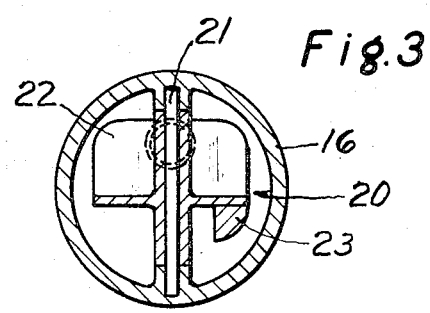
FIG. 3 is a sectional view, with parts in elevation, taken on line 3—3 of FIG. 1.

The embodiment of my invention shown in FIGS. 1, 2 and 3 comprises a plug body herein illustrated as being formed of a forward section 15 and a rear section 16 having a transverse partition 17 between them. Obviously this construction can be varied. A cavity 14 is provided in rear section 16. Line attachment means 18 is provided in the leading end of the front section 15 and hook attachment means 19 is attached to the plug body 15,16 intermediate its two ends. When hooks of the usual weight are supported from the hook attachment means 19 they will normally prevent rolling of the plug in the water and maintain said plug in a predetermined rotary position with the hooks hanging down. The plug body 15,16 can be formed of plastic, wood or other suitable material.

In accordance with my invention a water driven rotor or water wheel 20 having a shaft 21 is rotatively mounted in the cavity 14 in rear plug section 16. The form of the rotor 20 shown in FIGS. 1 to 3 can be varied but this rotor is herein illustrated as being a small water wheel having vanes 22 against which water can react to rotate it. The weight of water wheel 20 is off-center relative to its axis of rotation, which is shaft 21. In the instance of water wheel 20 a weight 23 is secured to said wheel in an off-center position. This off-center weight causes the wheel 20 to vibrate or pound when it is rotated and, in so doing, impart an erratic or wabbling movement to the plug body. An opening 24 in the rear end portion of plug body section 16 provides for a free escape of water from cavity 14 and makes it possible for rearwardly moving water on the exterior of the plug to exert a suction in cavity 14.

Suitable conduit means, herein shown to be a tube 25, is provided in the plug body forwardly of the water wheel 20 to conduct water into the plug body and direct it against the vanes 22 of water wheel 20. The intake of conduit 25 can be in the forward end of the plug body or it can be in a side of said plug body as hereinafter explained in connection with FIG. 6.

When the plug 15,16 is being trolled through water or is anchored in flowing water the water supplied through conduit 25 will rotate the rotor 20 at fairly high speed thus causing the off-center weight 23 to vibrate or pound and impart to the plug body an erratic or wabbling movement which makes it more alluring to fish.

Usually the hooks secured to hook attachment means 19 are heavy enough to prevent substantially all rolling of the plug in the water and preferably the shaft 21 is positioned so its axis is approximately vertical when the plug is in the water. When said shaft 21 is vertical gravity will have little effect on the action of the off-center weight of the rotor 20. If the shaft 21 is horizontal or is inclined substantially relative to the vertical then the action of gravity can amplify the vibrations produced by the off-center weight of the rotor.

Figures 4, 5, 7:
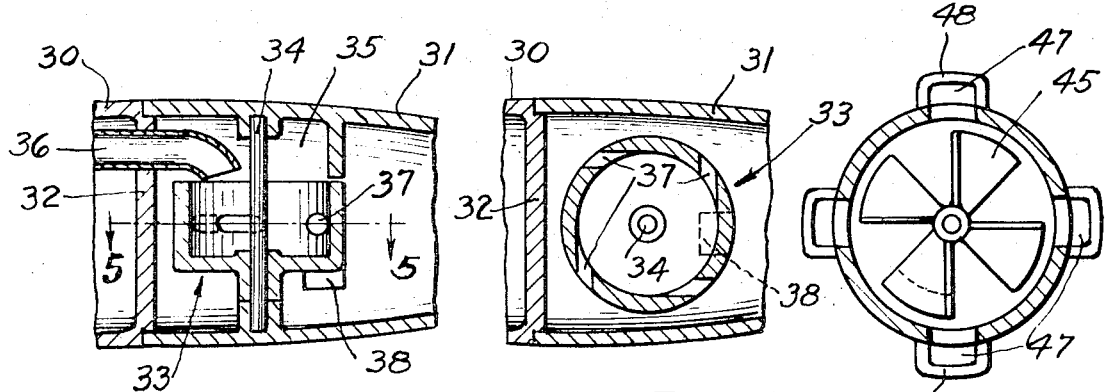
FIG. 4 is a fragmentary longitudinal sectional view showing a modified form of my invention.
FIG. 5 is a sectional view taken on line 5—5 of FIG. 4.
FIG. 7 is a view, partly in section and partly in elevation, taken on line 7—7 of FIG. 6.

In the embodiment of my invention shown in FIGS. 4 and 5 a plug body is formed of a forward section 30 and a rear section 31 separated by a transverse partition 32. A cup shaped water wheel or rotor 33 on an upright shaft 34 is rotatively mounted in a suitable cavity in the rear plug section 31. A water receiving chamber 35 is provided in body section 31 in registration with the open upper end of the cup shaped rotor 33. A water inlet conduit 36, similar to previously described conduit 25, has its discharge end positioned in chamber 35 and delivers water into cup shaped rotor 33. The cylindrical walls of rotor 33 are provided with approximately tangential water discharge passageways 37 through which jets of water discharge and inpart rotation to the rotor 33.

The weight of the rotor 33 is off-center and unbalanced relative to its axis of rotation, for instance, by making one part 38 of the circumferential wall of said rotor thicker and heavier than other parts of said wall. The operation of rotor 33 with its off-center weight 38 is similar to that of rotor 20, previously explained, in producing vibrations which are transmitted to the plug body.

Figure 6:
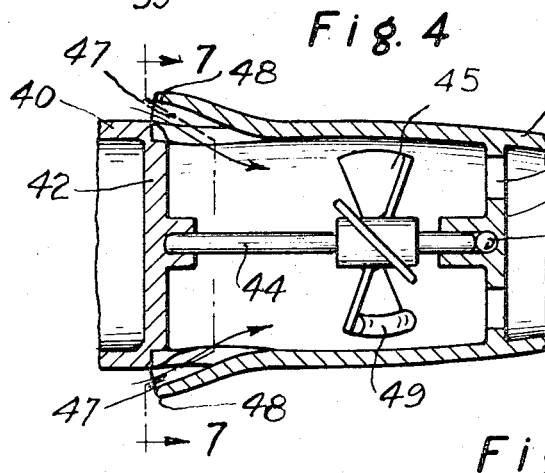
FIG. 6 is a fragmentary view, partly in longitudinal section and partly in elevation, of another modified form of my invention.

The embodiment of my invention shown in FIGS. 6 and 7 comprises a plug body formed of a forward section 40 and a rear section 41 having within them two spaced apart transverse partitions 42 and 43. A longitudinally extending shaft 44 is supported by the partitions 42 and 43 and a rotor or water wheel 45 having pitched or inclined vanes like the vanes of a rotary fan is carried by the shaft 44. The rotor 45 is illustrated as being fixedly attached to the shaft 44 and said shaft 44 as being journaled in partitions 42 and 43 and as having a ball 44' serving as a thrust bearing at its rear end. Suitable openings 46 are provided in the partition 43 through which water can discharge from the chamber of rotor 45. A plurality of water inlet openings 47 are provided in body section 41 forwardly of rotor 45 and said body section is shaped so as to provide a scoop shaped water deflecting lip 48 near the rear edge of the opening 47 to deflect water inwardly through said opening and drive rotor 45. A weight 49 is secured to preferably one vane of the rotor 45 at a substantial distance outwardly from the shaft 44 to unbalance the rotor 45 and produce vibrations or pounding and thus impart an erratic or wabbling movement to the plug body when the rotor is rotated. In this form of the invention it is possible to omit the openings 47 and lips 48 and to provide a water conduit, similar to conduit 25 of FIG. 1, to direct water onto rotor 45.

Figure 8:
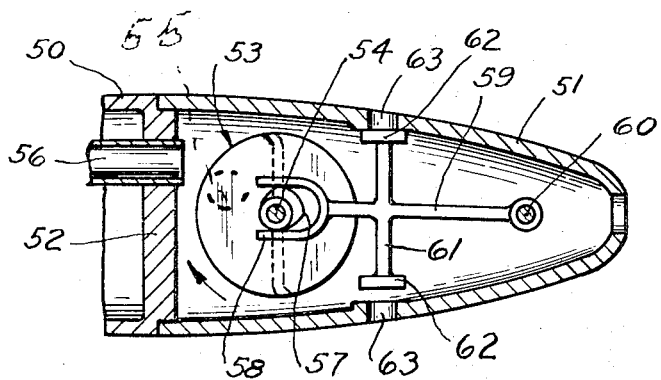
FIGS. 8, 9, 10 and 11 are each fragmentary views partly in longitudinal section and partly in elevation, illustrating respectively four other modified forms of my invention.

The embodiment of my invention shown in FIG. 8 comprises a plug body formed of a forward section 50 and a rear section 51 having between them a transverse partition 52. A suitable cavity in rear section 51 has within it a water driven rotor 53 supported by a shaft 54. Rotor 53 is provided with an off-center weight 55 and is generally similar in construction and mode of operation to the rotor 20 shown in FIGS. 1 to 3. A conduit 56 is provided to direct water against the vanes of rotor 53 and rotate the same. Devices operated by rotation of the rotor 53 are provided for bringing about a discharge of interrupted jets of water from opposite sides of the plug body in generally transverse directions to impart wabbling movement to said plug body. These water jet control devices comprise a cam 57 on the rotor 53 or its shaft 54 positioned between forked arms 58 on the end of a lever 59. The lever 59 is pivoted at 60 and carries two oppositely extending transverse arms 61. Each arm 61 has a valve member 62 on its outer end positioned to close and open a water outlet port 63 in the plug section 51. Rotation of rotor 53 will swingingly move arm 59 and alternately open and close the ports 63 thus directing jets of water out of said ports alternately and deflecting the rear end of said plug sidewise, first in one direction and then the other. At the same time the cam 57 functions as an off-center weight tending to vibrate the rotor and plug and the two forces combine to impart an erratic movement to the plug in the water.

Figure 9:
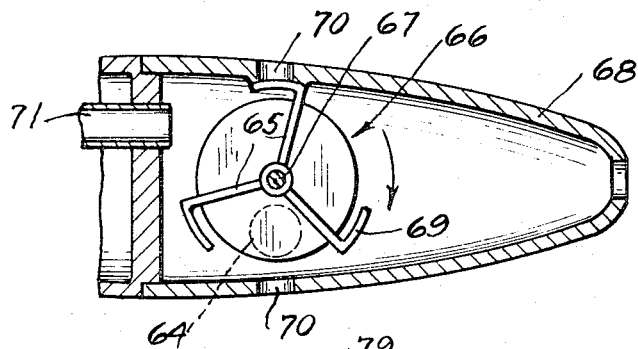

In the embodiment of my invention shown in FIG. 9 the vanes 65 of a water wheel or rotor 66, which carries an off-center weight 64 and is mounted by a shaft 67 in the rear end portion 68 of a plug body, have fairly wide outer edge portions 69 which are positioned and dimensioned so they will move in close proximity to and momentarily close water outlet ports 70 in the sides of plug body member 68 as the rotor 66 is rotated. A conduit 71 in the plug body forwardly of rotor 66 is positioned to direct water onto said rotor to rotate the same. Momentary closing of the ports 70 by parts 69 of vanes 65 tends to deflect the plug sidewise and combines with the vibration resulting from the off-center weight of the rotor to impart to the plug an erratic movement.

Figure 10:
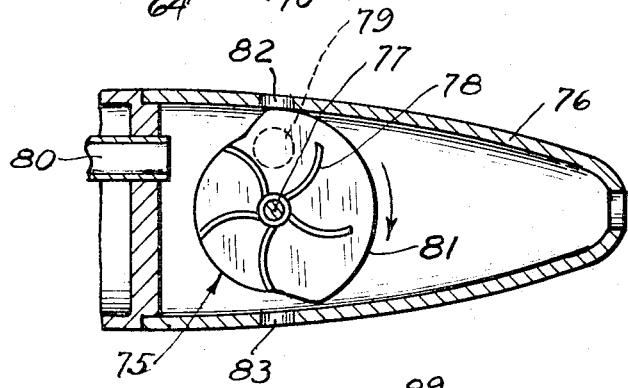

The embodiment of my invention disclosed in FIG. 10 shows a rotor 75 rotatively supported in the rear end portion of a plug body 76 by a shaft 77. Rotor 75 has vanes 78 and is provided or constructed with an off-center weight 79. A water conduit 80 is positioned to direct water against the vanes 78 to rotate said rotor. Rotor 75 is constructed so that a substantial part 81, preferably about one half of its periphery, is wide enough and is properly positioned so it will obstruct and substantially close each of two oppositely positioned water discharge ports 82 and 83 in the wall of plug member 76 when it is in registration with and moving past the port. Preferably the part 81 operates close to but not in frictional contact with the walls of plug body member 76. This allows the rotor to rotate freely and, at the same time, provides for cutting off most of the discharge from each port 82 and 83 for about one half of each cycle of the rotor 75 and for discharging jets of water alternately from opposite sides of the plug member 76. The side thrust, in alternate directions, of these jets of water and the vibratory force of the off-center weight 79, being exerted on the plug at the same time, impart to said plug an erratic or wabbling movement. In lures of the types shown in FIGS. 8, 9 and 10, in which interrupted jets of water are discharged from different sides of the plug body at successive intervals these jets alone will impart an erratic movement to said plug body even though the weight of the rotor is not dynamically unbalanced, as by attaching a weight to it in an off-center position.

Figure 12:
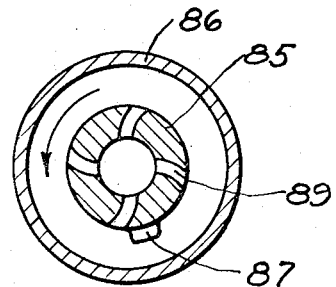
FIG. 12 is a sectional view taken on line 12—12 of FIG. 11.
Figure 11:
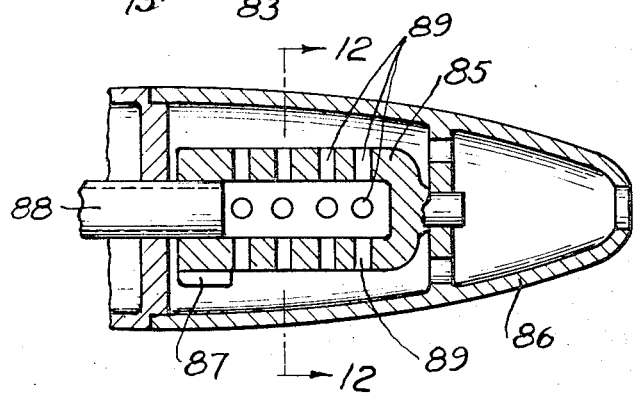

FIGS. 11 and 12 show a form of my invention comprising a tubular, cylindrical, water driven rotor 85 extending lengthwise of, and rotatively supported in a plug body 86 substantially coaxially of the rear end portion of said plug body. The rotor 85 is provided with an off-center weight which will cause it to vibrate and pound when it is rotated. A water conduit 88 is suitably positioned and arranged to direct water into the forward end of the rotor 85 when the plug is in use. The walls of the rotor 85 are of substantial thickness and are provided with a plurality of water discharge passageways 89. Passageways 89 are curved so that water will discharge from them in generally tangential directions and will exert a force tending to rotate rotor 85. Obviously passageways 89 can be straight like passageways 37 shown in FIGS. 4 and 5. The off-center weight 87 functions similarly to previously described off-center weights in imparting vibrations or erratic movements to plug body 86.

I claim:

1. In a plug type fishing lure, a plug body having in its rear end portion a cavity; a water driven rotor mounted for rotation in said cavity about an axis and with the weight of the rotor off-center relative to said axis; a water conduit in said plug body having an intake opening forwardly of said rotor and a discharge opening positioned to direct water onto said rotor to thereby rotate said rotor, the off-center weight of said rotor relative to its axis of rotation vibrating said rotor and imparting to the plug body an erratic movement alluring to fish when the plug body is in water and there is substantial relative movement between the water and the plug body; at least one water discharge port extending from said cavity outwardly through a side wall of the plug body; and means operable in opening and closing said port connected with said rotor and controlled by rotary movement of said rotor.

2. The plug type fishing lure as claimed in claim 1 in which the water driven rotor has vanes extending in generally radial directions against which the water reacts.

3. The plug type fishing lure as claimed in claim 1 in which the off-center weight of said rotor is provided by a weight attached to said rotor in a position outwardly from the axis of rotation of said rotor.

4. The plug type fishing lure as claimed in claim 1 in which an opening is provided in the plug body rearwardly of said rotor between said cavity and the exterior of the plug body, whereby water outside of the plug body and moving in a rearward direction relative to and close to the plug body will exert a suction in said cavity.

5. The plug type fishing lure as claimed in claim 1 in which two approximately diametrically opposite water discharge ports extend from said cavity outwardly through side walls of the plug body and in which means operable in opening one of said ports and simultaneously closing the other port whereby jets of water will be discharged alternately from opposite sides of said plug body, is connected with said rotor and controlled by rotary movement of said rotor.

6. The plug type fishing lure as claimed in claim 5 in which the means operable in opening one of said ports and simultaneously closing the other port is a movably supported valve carrying member connected with the rotor and two valves carried by said valve carrying member, each valve being movable by said valve carrying member into open and closed relation to one of said ports in response to rotary movement of said rotor.

7. The plug type fishing lure as claimed in claim 5 in which the means operable in opening one of said ports and simultaneously closing the other port is an approximately semicircular member of substantial width on the water driven rotor movable alternately past said ports in close proximity to said ports and in water shut-off relation to said ports.

* * * * *